United States Patent
Bahls

(10) Patent No.: US 9,161,108 B2
(45) Date of Patent: Oct. 13, 2015

(54) METHOD AND SYSTEM FOR ESTABLISHING COMMUNICATION RELATIONS

(75) Inventor: Thomas Bahls, Greifswald (DE)

(73) Assignee: Adtran GmbH, Berlin-Siemensstadt (DE)

( * ) Notice: Subject to any disclaimer, the term of this patent is extended or adjusted under 35 U.S.C. 154(b) by 750 days.

(21) Appl. No.: 12/302,224

(22) PCT Filed: Apr. 27, 2007

(86) PCT No.: PCT/EP2007/054134
§ 371 (c)(1),
(2), (4) Date: May 15, 2009

(87) PCT Pub. No.: WO2007/137921
PCT Pub. Date: Dec. 6, 2007

(65) Prior Publication Data
US 2009/0265476 A1    Oct. 22, 2009

(30) Foreign Application Priority Data
May 26, 2006  (DE) .......................... 10 2006 024 707

(51) Int. Cl.
*G06F 15/16*    (2006.01)
*H04Q 11/04*    (2006.01)
(Continued)

(52) U.S. Cl.
CPC .............. *H04Q 11/04* (2013.01); *H04L 12/185* (2013.01); *H04L 65/4076* (2013.01);
(Continued)

(58) Field of Classification Search
None
See application file for complete search history.

(56) References Cited

U.S. PATENT DOCUMENTS 5,586,121 A * 12/1996 Moura et al. ..................... 725/64
6,005,561 A * 12/1999 Hawkins et al. ................ 725/37
(Continued)

FOREIGN PATENT DOCUMENTS

EP    1517472 A1  *  3/2005
WO    2007119403 A1   10/2007

OTHER PUBLICATIONS

Brassil, Jack et al. "Structuring Internet Media Streams with Cueing Protocols." IEEE/ACM Transactions on Networking. vol. 10, No. 4. Aug. 2002. 466-76. IEEE Press.*
(Continued)

*Primary Examiner* — Jeffrey R Swearingen
(74) *Attorney, Agent, or Firm* — Laurence A. Greenberg; Werner H. Stemer; Ralph E. Locher

(57) ABSTRACT

The invention relates to a method and a system for establishing communication relations (stream1, stream2, stream3) via a communication medium, at least one communication relation (stream1, stream2) being established via said communication medium. According to the invention, information on queries for establishing one respective communication relation (stream1, stream2, stream3) is recorded, and, depending on the recorded information, at least one of the already established communication relations (stream1, stream2) is terminated or maintained. The information recorded can be e.g. the query times ($t_i$), the interval lapsed between two queries being used to infer the type of communication relation (stream1, stream2, stream3). According to the invention it is for example possible for short intervals to infer queries for IP-TV data streams and previously established communication relations (stream1, stream2) are directly terminated in order to save band width.

9 Claims, 2 Drawing Sheets

(51) Int. Cl.
  *H04L 12/18* (2006.01)
  *H04L 29/06* (2006.01)
  *H04L 29/08* (2006.01)

(52) U.S. Cl.
  CPC ............ *H04L 65/601* (2013.01); *H04L 69/14* (2013.01); *H04L 69/28* (2013.01); *H04L 67/303* (2013.01); *H04L 67/306* (2013.01); *H04Q 2213/1327* (2013.01); *H04Q 2213/13039* (2013.01); *H04Q 2213/13095* (2013.01); *H04Q 2213/13204* (2013.01); *H04Q 2213/13213* (2013.01); *H04Q 2213/13242* (2013.01); *H04Q 2213/13248* (2013.01); *H04Q 2213/13298* (2013.01); *H04Q 2213/13332* (2013.01); *H04Q 2213/13376* (2013.01)

(56) References Cited

U.S. PATENT DOCUMENTS

| | | | | |
|---|---|---|---|---|
| 6,184,878 B1* | 2/2001 | Alonso et al. | ................. | 725/109 |
| 6,247,058 B1* | 6/2001 | Miller et al. | ................. | 709/234 |
| 6,751,673 B2* | 6/2004 | Shaw | ............................ | 709/231 |
| 7,444,426 B2* | 10/2008 | Jenkins et al. | ................ | 709/238 |
| 7,472,197 B2* | 12/2008 | Li et al. | ......................... | 709/231 |
| 7,607,152 B1* | 10/2009 | Gordon et al. | .................. | 725/54 |
| 7,644,172 B2* | 1/2010 | Stewart et al. | ................ | 709/231 |
| 7,707,300 B1* | 4/2010 | Champagne | ................ | 709/231 |
| 7,793,317 B2* | 9/2010 | Sullivan et al. | ................ | 725/14 |
| 2003/0035444 A1* | 2/2003 | Zwack | .......................... | 370/503 |
| 2005/0177853 A1* | 8/2005 | Williams et al. | ................ | 725/81 |
| 2006/0277577 A1* | 12/2006 | Kiiskinen et al. | ............... | 725/62 |
| 2009/0257432 A1 | 10/2009 | Yamaguchi et al. | | |

OTHER PUBLICATIONS

Pan, Yi et al. "An End-to-End Multi-Path Smooth Handoff Scheme for Stream Media." Proceedings of the 1st ACM international workshop on wireless mobile applications and services on WLAN hotspots. Sep. 2003. ACM Press. 64-74.*

Merriam-Webster Dictionary, definition of "establish". Retrieved from http://www.merriam-webster.com/dictionary/establish on Sep. 4, 2014. 1 page.*

* cited by examiner

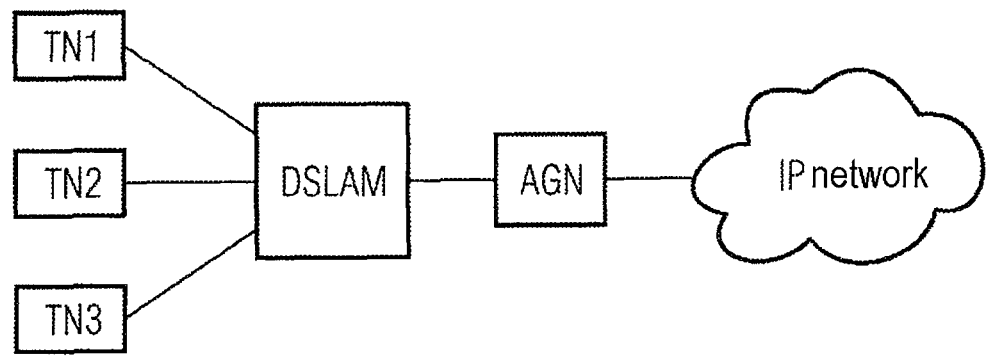
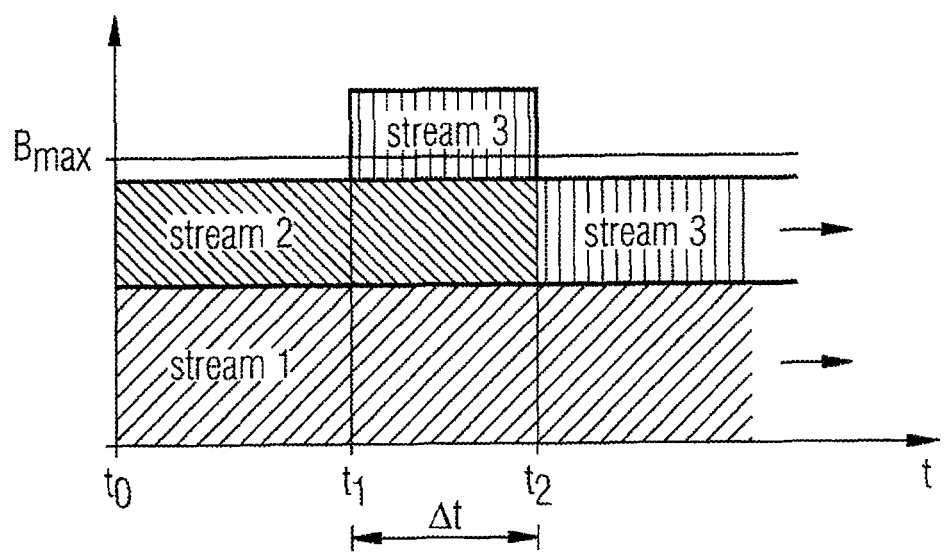

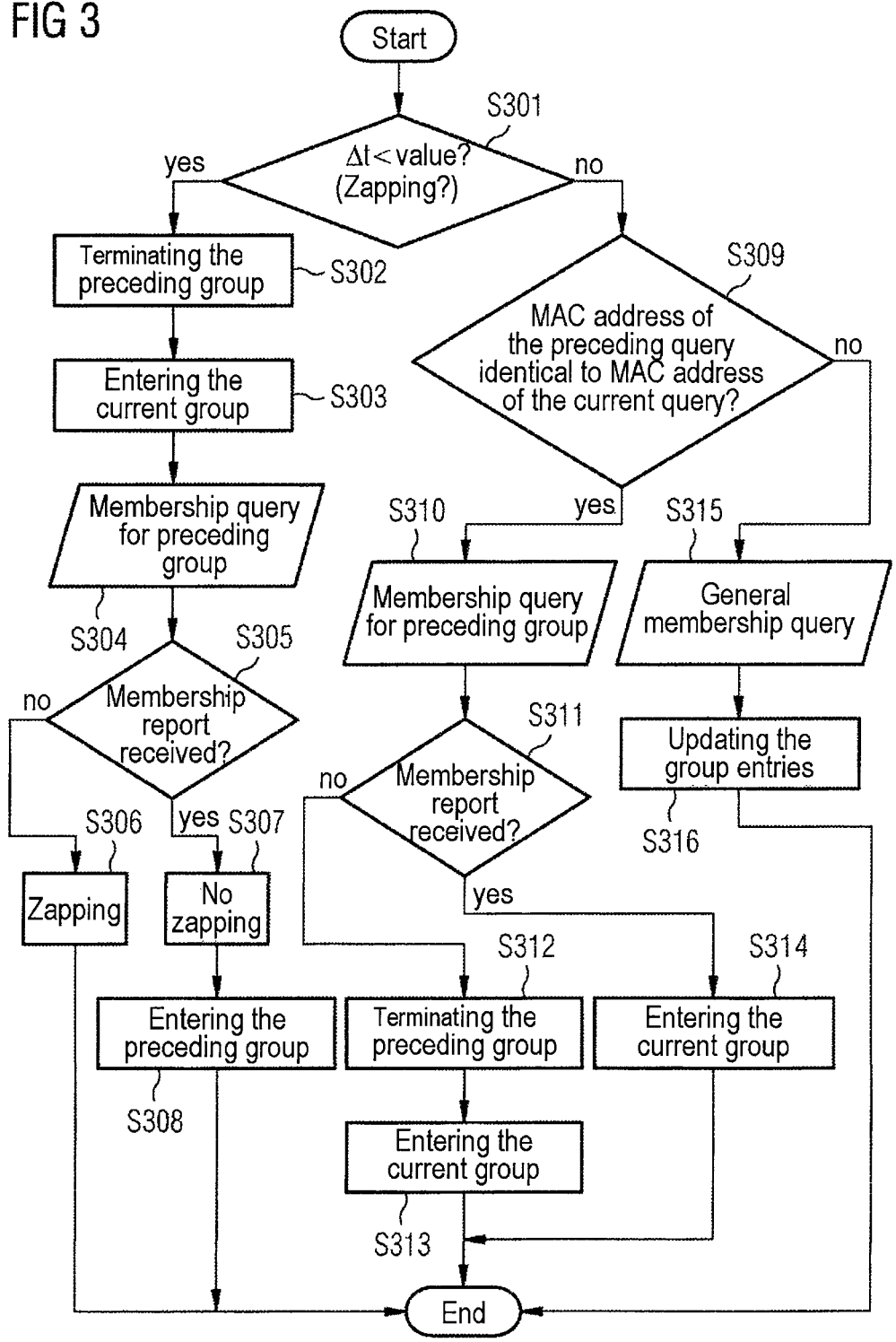

METHOD AND SYSTEM FOR ESTABLISHING COMMUNICATION RELATIONS

CLAIM FOR PRIORITY

This application is a national stage application of PCT/EP2007/054134, filed Apr. 27, 2007, which claims the benefit of priority to German Application No. 10 2006 024 707.8, filed May 26, 2006, the contents of which hereby incorporated by reference.

TECHNICAL FIELD OF THE INVENTION

The invention relates to a method and to an arrangement for establishing communication relations.

BACKGROUND OF THE INVENTION

In current communication networks, the users require increasingly higher data transmission rates. Transmission methods which can provide high transmission rates also in the subscriber access networks of a communication network are, for example, methods which operate in accordance with the xDSL method. Using these transmission methods, the operators of communication networks can also offer their customers broadband connections, for example to the Internet, by means of which the subscribers can utilize numerous applications in an increasingly simpler and more rapid manner. An example of such a data-intensive application for which high transmission rates are needed is, for instance, the transmission of real-time-related multimedia files.

In particular, for example, popular television channels will also in future be increasingly transmitted via packet-oriented communication networks such as, for example, an IP (Internet Protocol) network. This service is considered to be part of the so-called "triple plays", which means that three—originally separate—data services (telephone, Internet, television) are conveyed via the same communication network.

In this context, the information is usually transmitted in so-called streams in the case of television transmissions via an IP network (IP TV). This means that a central server converts the television channels into a continuous flow of data (the channels are "streamed") and these data streams are distributed to individual subscribers. As part of such a distribution service, the data stream is received by the individual subscribers, converted back and subsequently displayed on a screen.

To be able to successfully offer this type of television transmission, however, it is necessary to observe that the subscribers or the customers are also provided with at least the same quality of television pictures as is the case with current TV networks (cable, satellite, aerial) with such a streaming method.

This specifically means that, on the one hand, adequate picture quality is achieved, for example. Especially in the case of video transmissions, transmission errors become apparent in errors in the picture representation which are easily recognized and therefore extremely disturbing. Thus, for example, the picture may appear blurred or so-called block errors occur, i.e. individual parts or blocks of the picture are represented wrongly.

On the other hand, however, to successfully offer IP TV, it must also be ensured that further features or characteristics to which the subscribers to conventional television transmission networks are used are also offered in the case of IP TV. One of these characteristics is a shortest possible switch-over time when switching between two television channels.

While this is normal with conventional TV networks since all receivable channels are simultaneously present at the connection of the subscriber in these networks, it is different in the case of IP-based (or Ethernet) networks: in such networks, only the requested channels are ever present at the connection of a subscriber. In principle, a subscriber in an IP network informs a central server that he wishes to receive a certain stream (a certain television channel), i.e. the subscriber makes a request for a communication connection with this server. The server thereupon forwards the corresponding stream to the subscriber. In the case of a switch-over process, which corresponds to a change of the stream, this switch-over must therefore first be notified to the server by means of various protocols and finally be carried out by the server (or by two servers, if both streams come from different servers). With each switch-over of the television channel, a new stream must thus be requested and set up (or a new communication connection established), a method which is more elaborate and therefore needs more time than the switch-over in conventional TV networks.

In current IP networks, the distributing of a stream to one or more subscribers is achieved by means of so-called multipoint connections. In this context, a data stream can be conveyed from a starting point or transmitter (for example a central server within the IP network) simultaneously to several receivers or subscribers. This is a "point-to-multipoint" connection or a so-called "multicast" method or multicast transmission.

Multicast transmissions are currently controlled in most cases by means of the "Internet Group Management Protocol" (IGMP). The IGMP is based on the Internet Protocol and provides for group communication. In a multicast transmission (multicasting), single IP packets are simultaneously distributed under an IP address to several stations (to a group of stations). To reduce the volume of data produced, if possible, the IGMP provides the possibility of distributing groups dynamically. Individual subscribers or connections are thus allocated to certain groups with a particular offer. However, these groups are not administered in the transmitting station but, for example, in individual network nodes or in the routers along the way to the receiver. For this purpose, information about the outgoing interface at which a station or a connection is located to which certain multicast IP packets are to be forwarded is stored in the routers. In the IGMP, functions are implemented by means of which, for example, the routers can communicate with one another and by means of which stations can inform a router that the corresponding subscriber wishes to receive certain multicast IP packets.

In multipoint connections managed in this manner, it is thus in most cases not known in the transmitter which or even how many subscribers receive its IP packets. According to IGMP, the transmitter only sends out a single data packet to the corresponding higher-level router. It is only within the individual routers of the communication network that the IP packets are finally multiplied if necessary. This is done in dependence on the number of stations connected to the respective routers which are intended to receive the corresponding IP packets. Thus, all network nodes involved in the communication must support a multicast protocol such as IGMP.

In multicast protocols, commands for requesting IP packets also exist in addition to numerous other protocol commands: for example, a subscriber applies for membership in a group by means of the so-called "join" command ("Join-Group"), i.e. the subscriber may request a certain stream or television channel whereupon he becomes a further receiver of the corresponding IP packets.

If a subscriber wishes to leave a group of which he is currently a member, this can be done in accordance with various methods according to the prior art. On the one hand, this can be done under timer control (e.g. IGMP Version 1), on the other hand, a membership can also be terminated directly by means of a suitable command (e.g. IGMP, Version 2). In the case of timer-controlled methods (like the IGMPv1 in which there is no terminating command), according to the protocol a subscriber device sends to the corresponding higher-level node, at predetermined time intervals, information which indicates that the respective subscriber still wishes to remain a member of said group. In the case where no such information is received at the network node within the predetermined time interval (when the timer in the network node has expired), the connection is terminated by the network node.

In other multicast protocols, there are certain commands for deliberately terminating a membership (e.g. IGMPv2: "LeaveGroup") Although the possibility thus exists in such cases to deliberately leave certain groups, numerous current multicast implementations such as, among others, for instance current set top boxes, still continue to operate without this "leave" command. In such cases, too, leaving a group is then controlled by timer.

A further possibility for ending membership of a group is the so-called "fast leave". This is an implicit ending of membership. This means that with each respective new "join" request by a subscriber, that is to say whenever the subscriber, for example, applies for a new television channel, the previous membership of another group is automatically ended. However, this method can only be used in rare cases since a prerequisite for this is that the subscriber in each case only has or wishes to have a single data stream.

Management of the individual subscribers and their group membership, that is to say management of the multicast connections can also be carried out, for example, centrally. Information regarding which connected subscribers have subscribed to which IP data streams or belong to which groups can thus be stored, e.g. in a central management unit or also in the DSLAM itself. For this purpose, for example, a table can be set up in which the currently subscribed IP streams are stored for each subscriber connection or else for each "media access control" address (MAC address), i.e., even in the case where several terminals are connected to one subscriber line, the group membership of each individual terminal is logged by means of the MAC address which is unambiguous for each device connected to an Ethernet. The information about the group membership can be recorded directly in the DSLAM, for example by monitoring the IGMP ("IGMP snooping").

In most cases, the following disadvantage is produced when leaving a group, or when subscribing to a new group, particularly in the abovementioned IP TV applications: if a subscriber subscribes to a new group, groups previously subscribed to are not always automatically left. This leads to the new applications in most cases not being able to immediately access the required bandwidth since a part of the existing bandwidth is still reserved for the previous application no longer required. Especially in the case of, for example, IP TV, this leads to an extension of the abovementioned problem of longer switch-over times since the newly selected channel cannot be displayed unless the transmission resources required for displaying the previous channel have first been released again.

SUMMARY OF THE INVENTION

The invention improves the provision of multimedia distribution services.

In one embodiment according to the invention, there is a method for establishing communication relations via a transmission medium, wherein at least one communication relation is already established via the transmission medium. In one aspect of the method, queries for information relating to establishing of in each case one communication relation are recorded and, depending on at least two recorded information items, at least one of the at least one communication relation already established is terminated or maintained.

One advantage of the method according to the invention is that individual communication relations can be released more quickly if they are no longer needed. This makes it possible to save bandwidth.

The recorded information items can comprise times of the queries. In this context, the at least one communication relation established can be terminated or maintained depending on a time interval elapsed between at least two recorded times. As a result, it is possible to infer the type of the requested data stream and the data streams already established by means for example of the length of the time interval which has elapsed between two queries.

Further advantageous embodiments of the method according to the invention and an arrangement for establishing communication relations can be found in the subclaims.

BRIEF DESCRIPTION OF THE DRAWINGS

In the text which follows, the invention will be explained in greater detail with the aid of the attached drawings, in which:

FIG. 1 shows in a block diagram a diagrammatic representation of a subscriber access network.

FIG. 2 shows the variation with time of the bandwidth requirement of several IP data streams at the subscriber connection.

FIG. 3 shows a flowchart of an exemplary sequence of the method according to the invention.

DETAILED DESCRIPTION OF THE INVENTION

FIG. 1 shows by way of example diagrammatically a structure of a subscriber access network of a current communication network. Three subscribers TN1, TN2 and TN3 are connected via in each case one subscriber line DSL1, DSL2 and DSL3, respectively, to a first network node at the exchange side, a so-called "digital subscriber line access multiplexer" (DSLAM). This DSLAM combines data from the connected subscribers (multiplexing) and forwards the collected data to the connected communications network. Furthermore, the DSLAM also distributes the data which are conveyed in the opposite direction, which are thus coming from the higher-level network, to the corresponding subscribers. At the network end, the DSLAM is connected to an aggregation network (AGN) which has the task of finally connecting several DSLAMs (not shown in FIG. 1) connected to this network to the main data network (for example an IP network in FIG. 1).

FIG. 2 illustrates a problem, forming the basis of the invention, by means of a diagrammatic graphical representation of several IP data streams. FIG. 2 graphically shows a distribution of three data streams (stream1, stream2, stream3) present at a subscriber connection over time (horizontal variation). The height of the individual data streams represents the bandwidth needed by the respective data streams. In addition, a maximum bandwidth ($B_{max}$) available for the corresponding subscriber is drawn in FIG. 2.

At time $t_0$, two IP data streams (stream1, stream2) are present at the connection considered (e.g. TN1 from FIG. 1). TN1 has thus currently subscribed to two groups, i.e. TN1 is currently a member of two groups. In this context, stream1 can be an arbitrary multicast application whereas it is assumed in this example for stream2 that this stream (stream2) is television data. Thus, in this example, two multicast applications are transmitted to the same subscriber connection (TN1) via the same subscriber line (DSL1) at time $t_0$, stream2 representing an IP TV application. In this context, stream1 and stream2 together do not need the entire bandwidth available on the subscriber line.

At time $t_1$, subscriber TN1 subscribes to a further, third multicast group (stream3), i.e. the subscriber TN1 sends a "join" request for group 3, in this case a further television channel, to the DSLAM. Following this, the data stream transmitting this further television channel is applied to subscriber line DSL1 of subscriber TN1.

As can be seen in FIG. 2, three multicast data streams (stream1, stream2, stream3) are then simultaneously present at the subscriber line DSL1 of subscriber TN1. However, since the existing bandwidth on DSL1 is less than the bandwidth needed for all three streams, the newly subscribed television channel (stream3) of subscriber TN1 cannot yet be transmitted completely or in sufficient quality and thus be displayed undisturbed at the subscriber TN1.

This is possible only from the time ($t_2$) at which data stream 2 (stream2) is terminated on the subscriber line DSL1. As explained in the introduction to the description, data stream 2 (stream2) can only be terminated after expiry of a timer when using, for example, IGMPv1. Neither is it possible in this example to immediately implicitly terminate stream2 on application for stream3 since several multicast data streams are already present (stream1 and stream2). Thus, it is not determined which of the two streams present should be terminated, i.e. no "FastLeave" is possible. For such cases in which the previous data stream (stream2) can thus only be terminated after a certain time interval ($\Delta t = t_2 - t_1$), and in those cases in which the "LeaveGroup" command can or should deliberately not be used for certain reasons, a prolonged switch-over time ($\Delta t$) is thus obtained disadvantageously and in most cases is felt to be disruptive by users.

As described in the text which follows, this time is reduced considerably by the method according to the invention. The exemplary sequence of the method is here explained with the aid of the flowchart from FIG. 3.

In the method according to the invention, it is investigated, for example, in a first section whether a new, that is to say current, query for a stream ("JoinGroup" command) sent by the subscriber concerns a fast switching-over or -through of television channels (so-called "zapping"). To determine this, the time between two join commands is measured according to the invention (S301). If the measured value is below a predeterminable threshold value, e.g. 2 seconds, zapping is recognized. According to the invention, it is thus assumed in such a case that in the case of many successive join commands received in short time intervals, the subscriber is switching through numerous television channels one after the other. If such zapping is recognized, the membership of the corresponding subscriber in the previously subscribed group is terminated directly according to the invention (S302). There is thus no waiting for the expiry of a timer. Furthermore, the newly subscribed group is entered into the management table in step S303.

Optionally, the changes in the group memberships previously carried out (in steps S302 and S303) can still be checked after step S303. For this purpose, it is checked whether the group just deleted is nevertheless still required by the subscriber, i.e. whether the assumption that this was zapping was wrong. For this purpose, a so-called "membership query" is sent only for the corresponding group and only to the relevant subscriber port, for example directly by the DSLAM (S304). This requires a confirmation as response (S305) if the corresponding group is still required. If this response does not occur, the assumption that this was zapping was correct (S306). If, however, a response ("membership report") reaches the DSLAM, it can be assumed against expectation that there is no zapping (S307) and the corresponding group can be immediately entered again in the management table (S308). This additional interaction immediately cleans up any error, that is to say an error would thus be eliminated far in advance of the next membership query sent routinely by the multicast router.

If it is determined in step S301 that the current query for a new group presumably is not a matter of zapping, i.e. if the time between two queries is above the predeterminable threshold value, further steps can be optionally initiated according to the invention in order to shorten the switch-over time. For example, it is possible to check whether the new request for subscription comes from the same MAC address as the preceding one (S309). If this is the case, it can also be assumed in this case—in spite of the slightly longer time interval between the queries—that the queries are queries for IP TV data streams. Here, too, it is possible to decide directly that this is "zapping", for example, and it can then be attempted to achieve a switchover almost without delay by directly deleting the preceding group membership. However, the option exists in such a case first to check the assumption made, to be on the safe side. For this purpose, according to the flowchart in FIG. 3, a membership query sent directly thereafter is used according to the invention to inquire, for example, whether the preceding group, which may have to be deleted, is still needed (S310). If this is not the case, and therefore no membership report is received as expected in step S311, the preceding membership is ended (S312) and the current group is newly entered (S313). If, however, the preceding group is still needed, and therefore a membership report arrives in step S311, the newly subscribed group is additionally entered in the management table (S314) and the subscriber accordingly subscribes to a further stream. Thus, a new additional communication connection is established.

If it is found in step S309 in the flowchart from FIG. 3 that the last two queries do not come from the same MAC address, no assumption can be made with respect to the groups to be deleted. In this case, however, the DSLAM can trigger, for example, a "general membership query", i.e. a membership query for all connected subscribers (S315). This corresponds to a membership query for each individual group. By means of this central general membership query, all group entries within the management table can thus be subsequently updated (S316) in dependence on the responses occurring. Switch-over time can also be saved by such a general membership query started directly after a query. Naturally, according to the invention, this can be carried out not only at the time shown in this exemplary embodiment but at any time, particularly in the cases in which it cannot be unambiguously determined whether the inquiry is a question of zapping or not.

Furthermore, it should be noted that, according to the invention, it is not necessary exclusively to determine the time interval between two directly successive queries in order to determine zapping. According to the invention, it is also possible to check the time elapsed between several successive queries. In addition, the time intervals between individual queries can also be considered with respect to certain subscriber connections or subscriber ports and also individual MAC addresses. In such a case, for example, all queries are stored sorted in accordance with the individual addresses in the management table and the method according to the invention is applied individually for each subscriber or each MAC address, respectively.

The invention claimed is:

1. A method for establishing communication connections for a transmission of television channels via a transmission medium, comprising:
    establishing a first communication connection via the transmission medium;
    recording, a time of a first query for the establishment of the first communication connection;
    establishing at least a second communication connection via the transmission medium;
    recording a time of a query for the establishment of the at least a second communication connection; and
    terminating the first communication connection if a time interval between at least two recorded times of queries is below a predefined threshold, otherwise, maintaining the first communication connection if the time interval is not below the predefined threshold.

2. The method as claimed in claim 1, wherein the first communication connection established is terminated when the time interval is below a predeterminable limit value.

3. The method as claimed in claim 1, wherein the recording step additionally includes recording information items for identifying at least one subscriber making the query.

4. The method as claimed in claim 1, wherein recording step additionally includes recording information items for identifying at least one subscriber terminal making the query.

5. The method as claimed in claim 1, wherein the communication connections are established and terminated between a central unit and at least one subscriber connection.

6. The method as claimed in claim 1, wherein the communication connections are established and terminated as part of a point-to-multipoint connection.

7. An arrangement for establishing communication connections for transmission of television channels via a transmission medium, having a first communication connection established via the transmission medium, comprising:
    a recording device configured to record times of queries for the establishment of the communication connections; and
    a device for terminating the first communication connection established if a time interval between at least two recorded times of queries is below a predefined threshold, otherwise, if the time interval is not below the predefined threshold, maintaining the first communication connection.

8. The arrangement as claimed in claim 7, wherein the device for terminating or maintaining is configured such that the first communication connection established is terminated when the time interval elapsed between at least two recorded times is below a predeterminable limit value.

9. A method for establishing communication connections for a transmission of television channels via a transmission medium, comprising:
    establishing a first communication connection via the transmission medium;
    recording a time of a first query for the establishment of the first communication connection;
    establishing at least a second communication connection via the transmission medium;
    recording a time of a second query for the establishment of the at least a second communication connection; and
    terminating the first communication connection if a time interval between a recorded time of a first query for the establishment of a first communication connection and a recorded time of a second query for the establishment of the at least a second communication connection is below a predefined threshold, otherwise, if the time interval exceeds the predefined threshold, maintaining the first communication connection.

* * * * *